(12) United States Patent
Zhang

(10) Patent No.: US 12,523,547 B1
(45) Date of Patent: Jan. 13, 2026

(54) MULTICHANNEL OPTICAL FIBER FLUORESCENCE TEMPERATURE MEASUREMENT DEVICE AND METHOD FOR ELECTROSTATIC CHUCK IN ETCHER

(71) Applicant: HERCH OPTO ELECTRONIC TECHNOLOGY CO., LTD., Shaanxi (CN)

(72) Inventor: Wensong Zhang, Shaanxi (CN)

(73) Assignee: HERCH OPTO ELECTRONIC TECHNOLOGY CO., LTD., Xi'an (CN)

( * ) Notice: Subject to any disclaimer, the term of this patent is extended or adjusted under 35 U.S.C. 154(b) by 0 days.

(21) Appl. No.: 19/223,712

(22) Filed: May 30, 2025

Related U.S. Application Data

(63) Continuation of application No. PCT/CN2025/074123, filed on Jan. 23, 2025.

(30) Foreign Application Priority Data

Jan. 20, 2025 (CN) .......................... 202510080341.2

(51) Int. Cl.
*G01K 11/32* (2021.01)
*G02B 6/42* (2006.01)
(52) U.S. Cl.
CPC ............ *G01K 11/32* (2013.01); *G02B 6/4298* (2013.01)

(58) Field of Classification Search
CPC .............................. G01K 11/32; G02B 6/4298
See application file for complete search history.

(56) References Cited

FOREIGN PATENT DOCUMENTS

| CN | 108645535 A | * | 10/2018 | ............. G01K 11/32 |
| CN | 210322790 U | * | 4/2020 | |
| JP | H09292072 A | * | 11/1997 | |

* cited by examiner

*Primary Examiner* — John E Breene
*Assistant Examiner* — Janice M Soto
(74) *Attorney, Agent, or Firm* — M&B IP Analysts, LLC

(57) ABSTRACT

Provided are a multichannel optical fiber fluorescence temperature measurement device for an electrostatic chuck in an etcher and a method. The device includes temperature sensors. Each temperature sensor includes a fluorescence temperature probe, a ceramic sleeve, a transition optical fiber, a transmission optical fiber, an optical coupling module, a photodetection module, and an operation light source module. The fluorescence temperature probe includes a fluorescent layer and a thermal conductive layer. An end face of the fluorescent layer is gold-plated. The thermal conductive layer includes a copper-diamond composite material, an end face thereof is gold-plated, and connected to the end face of the fluorescent layer by a vacuum reflow void-free welding process. The ceramic sleeve coats the transition optical fiber, an end face thereof is gold-plated, and connected to the fluorescence temperature probe by the vacuum reflow void-free welding process.

13 Claims, 7 Drawing Sheets

MULTICHANNEL OPTICAL FIBER FLUORESCENCE TEMPERATURE MEASUREMENT DEVICE AND METHOD FOR ELECTROSTATIC CHUCK IN ETCHER

CROSS-REFERENCE TO RELATED APPLICATION

This application is a continuation application of International Patent Application No. PCT/CN2025/074123, filed on Jan. 23, 2025, which claims priority of the Chinese Patent Application No. 202510080341.2, filed on Jan. 20, 2025, both of which are incorporated by references in their entities.

TECHNICAL FIELD

The present disclosure relates to the technical field of semiconductor etching, and in particular to a multichannel optical fiber fluorescence temperature measurement device and method for an electrostatic chuck in an etcher.

BACKGROUND

Etching technology is a fundamental manufacturing process for semiconductor devices and integrated circuits, which can selectively etch and peel off the surface of the semiconductor substrate or thin films on the surface according to the design requirements of the mask pattern, and decide the precision and quality of the semiconductor circuit pattern, thereby directly impacting the performance and yield of the final produced chips. The etcher, as main equipment for implementing the etching technology, can remove the material on the surface of the semiconductor wafer by physical or chemical means according to the preset shape to form a circuit pattern.

In the etcher, the electrostatic chuck is a key component configured to fix a position of the semiconductor wafer and control the temperature of the semiconductor wafer, which can ensure the precision and uniformity during etching, and thus is particularly important to control the production quality of the semiconductor device. The etching of semiconductor wafer is usually carried out under conditions with small temperature field variations, otherwise the etching rate and quality will be directly affected, leading to the shortening of the service life of the product, even causing damage to the semiconductor material. Therefore, it is necessary to accurately measure the temperature distribution on a surface of the semiconductor wafer so as to adjust heating or cooling apparatuses for the electrostatic chuck, thereby accurately controlling the temperature of the adsorbed semiconductor wafer.

However, the temperature measurement apparatus for the electrostatic chuck in the related art can only achieve local temperature measurement, and naturally cannot effectively control the temperature of the whole region of the semiconductor wafer to ensure consistency. Moreover, the temperature measurement apparatus for the electrostatic chuck has the temperature measuring accuracy of +1° C. and the temperature measurement range below 200° C., which is unable to meet the new requirements for temperature measurement of the current electrostatic chuck that the temperature measurement accuracy is less than or equal to +0.1° C. and the temperature measurement range is more than 200° C., and thus has limitation.

SUMMARY

In view of above defects or shortcomings in the related art, it is expected to provide a multichannel optical fiber fluorescence temperature measurement device and method for an electrostatic chuck in an etcher, which can achieve accurate measurement of temperature distribution on a surface of a semiconductor wafer while improving temperature measurement accuracy and broadening the temperature measurement range.

In some embodiments, a multichannel optical fiber fluorescence temperature measurement device for an electrostatic chuck in an etcher is described. The multichannel optical fiber fluorescence temperature measurement device for an electrostatic chuck in an etcher includes temperature sensors arranged at different regions of the electrostatic chuck. Each temperature sensor includes a fluorescence temperature probe, a ceramic sleeve, a transition optical fiber, a transmission optical fiber, an optical coupling module, a photodetection module, and an operation light source module. The fluorescence temperature probe includes a fluorescent layer and a thermal conductive layer which are arranged in a stacked manner. The fluorescent layer is prepared by a hot-press sintering method, and an end face of the fluorescent layer is gold-plated. The thermal conductive layer includes a copper-diamond composite material, and an end face of the thermal conductive layer is gold-plated and is connected to the end face of the fluorescent layer by a vacuum reflow void-free welding process. The ceramic sleeve is configured to coat the transition optical fiber, and an end face of the ceramic sleeve is gold-plated and is connected to the fluorescence temperature probe by the vacuum reflow void-free welding process. One end of the transition optical fiber is arranged opposite to the fluorescent layer, the other end of the transition optical fiber is connected to one end of the transmission optical fiber, the other end of the transmission optical fiber is connected to a first end of the optical coupling module, a second end of the optical coupling module is connected to the photodetection module, and a third end of the optical coupling module is connected to the operation light source module. The operation light source module is configured to output incident light capable of exciting the fluorescent layer to generate fluorescence, and the photodetection module is configured to detect lifetime of a fluorescence signal reflected by the fluorescent layer, and determine a temperature of a fluorescent material corresponding to the lifetime of the fluorescence signal according to a mapping relationship between lifetime of fluorescence and the temperature of the fluorescent material.

In some embodiments, a multichannel optical fiber fluorescence temperature measurement method is described. The multichannel optical fiber fluorescence temperature measurement method is applied to the multichannel optical fiber fluorescence temperature measurement device above. The multichannel optical fiber fluorescence temperature measurement method includes simultaneously outputting incident light capable of exciting fluorescent layers to generate fluorescence to the fluorescent layers of the multichannel optical fiber fluorescence temperature measurement device; detecting lifetime of fluorescence signals reflected by the fluorescent layers, and determining a temperature of a fluorescent material corresponding to the lifetime of the fluorescence signals according to a mapping relationship between lifetime of fluorescence and the temperature of the fluorescent material.

BRIEF DESCRIPTION OF THE DRAWINGS

To describe the technical solutions in the embodiments of the present disclosure or in the prior art more clearly, the accompanying drawings required for describing the embodiments are described as follows. Apparently, the accompanying drawings described below show merely some embodiments of the present disclosure, rather than limiting the present disclosure. Those of ordinary skill in the art may still derive other drawings from these accompanying drawings without creative efforts.

Figure 1:
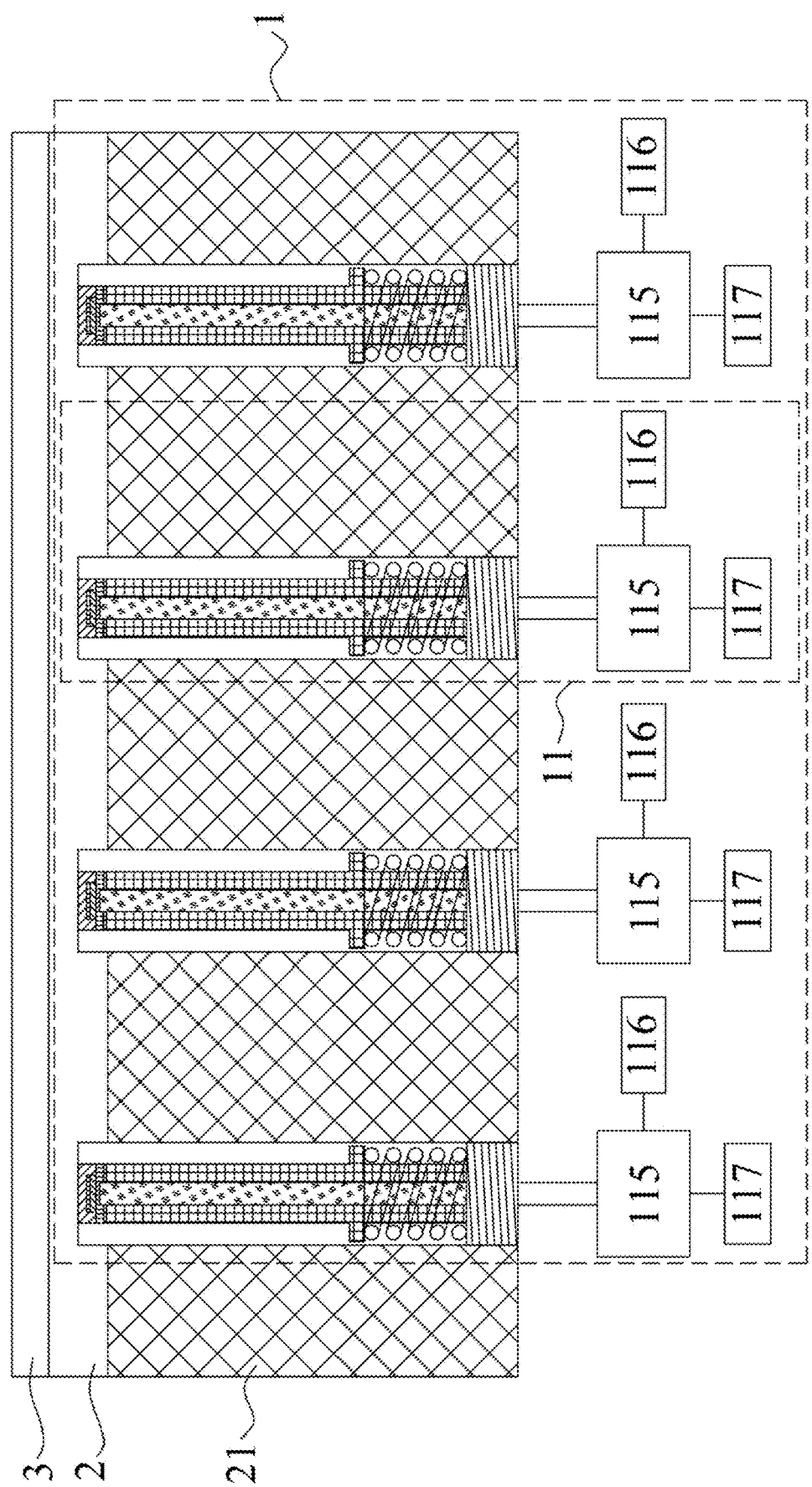
FIG. 1 is a structural diagram of a multichannel optical fiber fluorescence temperature measurement device for an electrostatic chuck in an etcher according to an embodiment.

REFERENCE NUMERALS 1-multichannel optical fiber fluorescence temperature measurement device; 11-temperature sensor; 111-fluorescence temperature probe; 1111-fluorescent layer; 1112-thermal conductive layer; 112-ceramic sleeve; 1121-compression spring; 1122-set screw; 113-transition optical fiber; 114-transmission optical fiber; 115-optical coupling module; 116-photodetection module; 117-operation light source module; 2-electrostatic chuck; 21-cooling layer of electrostatic chuck; 3-semiconductor wafer.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without inventive efforts shall fall within the scope of protection of the present disclosure.

In order to make the objectives, features and advantages of the present disclosure more clearly, the present disclosure is further described in detail below with reference to the accompanying drawings and specific embodiments.

It should be noted that the embodiments in the present disclosure and the features in the embodiments can be combined with each other without conflict. Hereinafter, the multichannel optical fiber fluorescence temperature measurement device and method for an electrostatic chuck in an etcher provided by the embodiment of the present disclosure are described in detail through FIG. 1 to FIG. 8.

Figure 2:
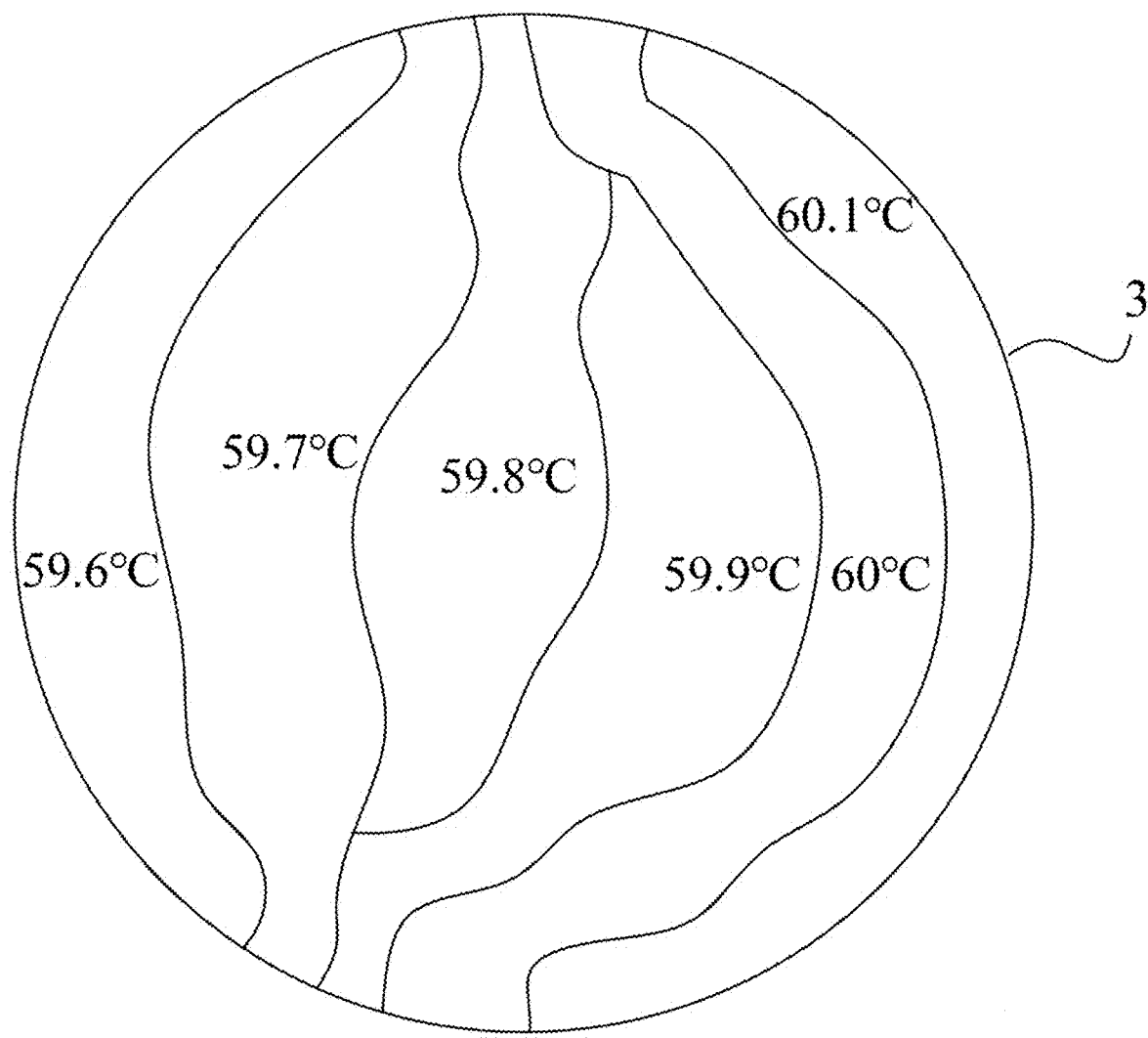
FIG. 2 is a schematic diagram of temperature field distribution on a surface of a semiconductor wafer according to an embodiment.

Referring to FIG. 1 which is a structural diagram of a multichannel optical fiber fluorescence temperature measurement device for an electrostatic chuck in an etcher according to an embodiment of the present disclosure, the multichannel optical fiber fluorescence temperature measurement device 1 includes temperature sensors 11 arranged at different regions of the electrostatic chuck 2. For example, as shown in FIG. 2 which is a schematic diagram of temperature field distribution on a surface of a semiconductor wafer 3, the temperature sensors 11 can be respectively located at different corresponding temperature regions of the semiconductor wafer 3 on the electrostatic chuck 2, where there are four to sixteen temperature measurement channels.

Figure 3:
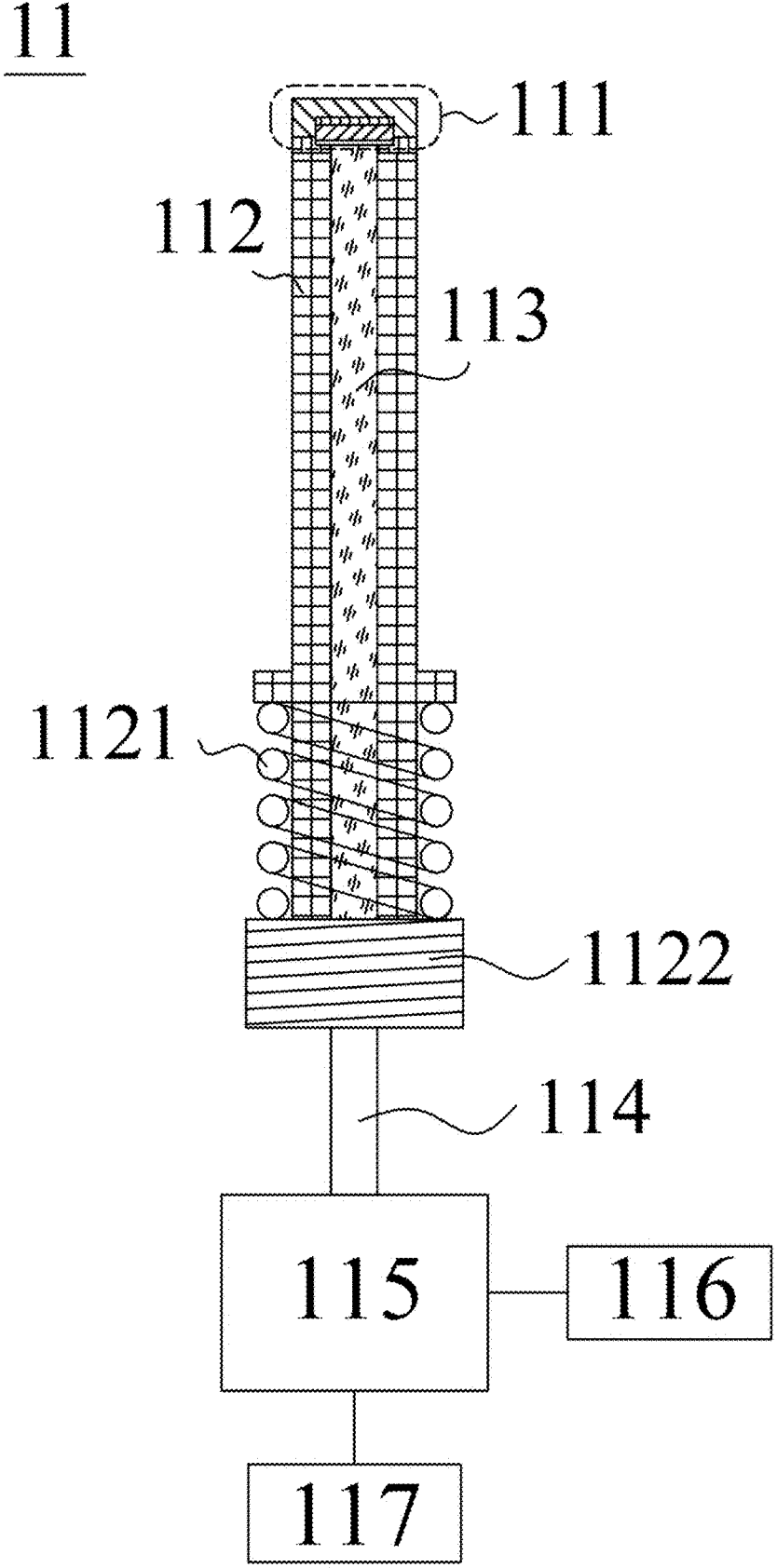
FIG. 3 is a structural diagram of a temperature sensor according to an embodiment.
Figure 4:
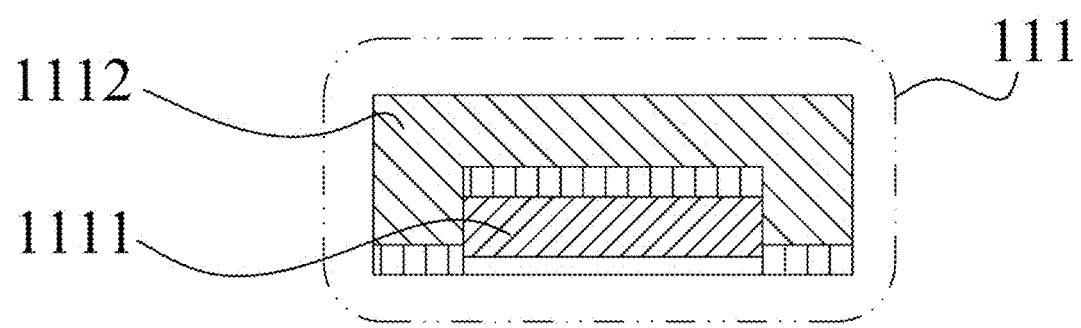
FIG. 4 is a structural diagram of a fluorescence temperature measurement probe according to an embodiment.

In one or more embodiments, as shown in FIG. 3, each temperature sensor 11 includes a fluorescence temperature probe 111, a ceramic sleeve 112, a transition optical fiber 113, a transmission optical fiber 114, an optical coupling module 115, a photodetection module 116, and an operation light source module 117. In some embodiments, as shown in FIG. 4, the fluorescence temperature probe 111 may include a fluorescent layer 1111 and a thermal conductive layer 1112 which are arranged in a stacked manner. The fluorescent layer 1111 is prepared by a hot-press sintering method, and an end face of the fluorescent layer 1111 is gold-plated. For example, the fluorescent layer 1111 includes, but is not limited to a mixture consisting of rare earth tricolor fluorescent powder, gadolinium terbium oxysulfide, and magnesium fluoro-germanate. Afterwards, the mixture is sintered at a high temperature above 1,000° C. to form a fluorescent material block, and then the block is cut into a square or round fluorescent layer 1111 with a thickness of 200 μm to 300 μm and a size of 1 mm to 2 mm, where manual operation is not needed in the machining process, thus ensuring that the sensors have higher consistency and interchangeability. A gold plating thickness on the end face of the fluorescent layer 1111 ranges from 1 μm to 3 μm, which is convenient for the welding the fluorescent layer with the thermal conductive layer 1112. Meanwhile, the gold is heat-resistant and has good thermal conductivity, the thermal conductive layer 1112 is in direct contact with a temperature measurement point, thus conducting heat to the fluorescent layer 1111 rapidly. For example, the thermal conductive layer 1112 includes a copper-diamond composite material resistant to high and low temperatures, and has the temperature measurement range from −120° C. to 450° C., and a thermal conductivity of 1000 W/m° C., thereby achieving a faster heat-conducting speed, more accurate measured temperature information, and higher temperature measurement frequency, which reaches 30 Hz. At the same time, the end face of the heat-conducting layer 1112 is gold-plated, and connected to the end face of the fluorescent layer 1111 by a vacuum reflow void-free welding process. A gold plating thickness on the end face of the thermal conductive layer 1112 ranges from 1 μm to 3 μm.

Figure 5:
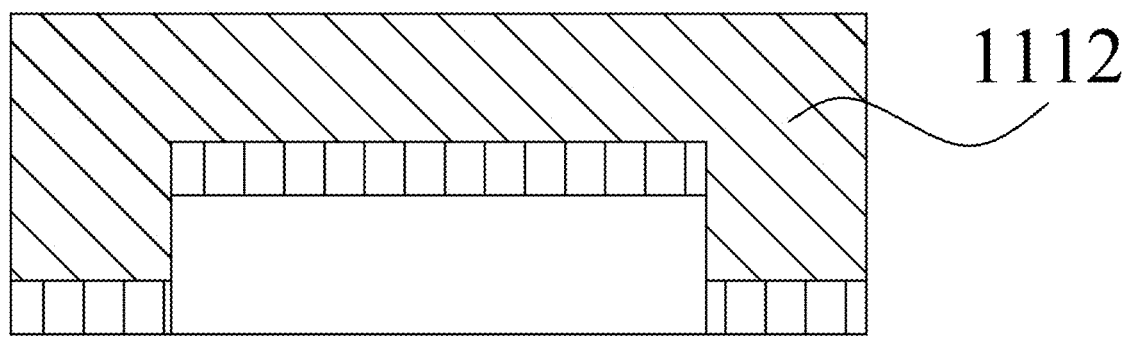
FIG. 5 is a structural diagram of a thermal conductive layer according to an embodiment.

In some embodiments, as shown in FIG. 5, the thermal conductive layer 1112 is of an inverted concave structure, where a first end face connected to the fluorescent layer 1111 and a second end face connected to the ceramic sleeve 112 are both gold-plated. For example, the gold plating thickness on each of the first end face and the second end face ranges from 1 μm to 3 μm. Such an arrangement has advantages that the contact area between the thermal conductive layer 1112 and the fluorescent layer 1111 can be increased, to obtain a faster response speed, and finally a more accurate measured temperature.

Figure 6:
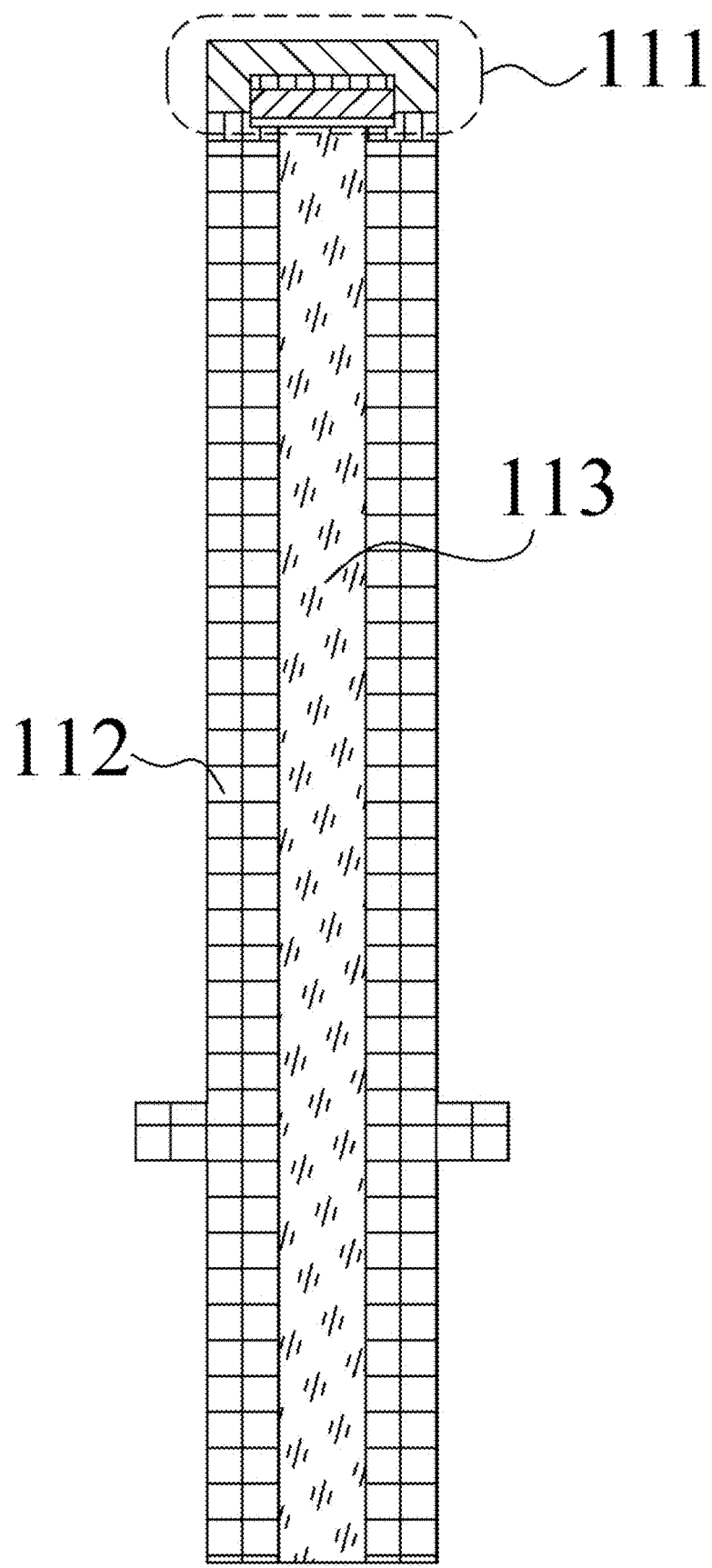
FIG. 6 is a structural diagram of a ceramic sleeve according to an embodiment.

In some embodiments, as shown in FIG. 6, the ceramic sleeve 112 is configured to coat the transition optical fiber 113, one end of the transition optical fiber 113 is arranged opposite to the fluorescent layer 1111, an end face of the ceramic sleeve 112 is gold-plated, and is connected to the fluorescence temperature probe 111 by the vacuum reflow void-free welding process. For example, the ceramic sleeve 112 includes, but not limited to, low-thermal-conductive materials such as a zirconia material and a silicon nitride material, where a thermal conductivity of the zirconia material is 2.2 W/m.° C., and a thermal conductivity of the silicon nitride material is 3.4 W/m° C., thereby effectively isolating external heat conduction into the transition optical fiber 113, preventing interference to the temperature measurement process, and protecting the transition optical fiber 113. For another example, the gold plating thickness on the end face of the ceramic sleeve 112 also ranges from 1 μm to 3 μm, thus achieving the glue-free connection between the fluorescent layer 1111 and the transition optical fiber 113. It should be noted that the solder between the fluorescent layer 1111 and the thermal conductive layer 1112 in the embodiment of the present disclosure may be a high-temperature welding material such as gold-tin solder with a high welding temperature up to more than 300° C., while the solder between the fluorescence temperature probe 111 and the ceramic sleeve 112 may be a low-temperature welding material such as lead solder with a welding temperature of 200° C. That is, the high-temperature welding material is used for the first welding, and the low-temperature welding material is used for the second welding. Such an arrangement ensures that the second welding will not affect the effect of the first welding, achieves a whole glue-free structure, and avoids destroying the rapid and accurate thermal conductivity of the fluorescence temperature probe 111 as the welding materials are also excellent thermal conductors.

Figure 7:
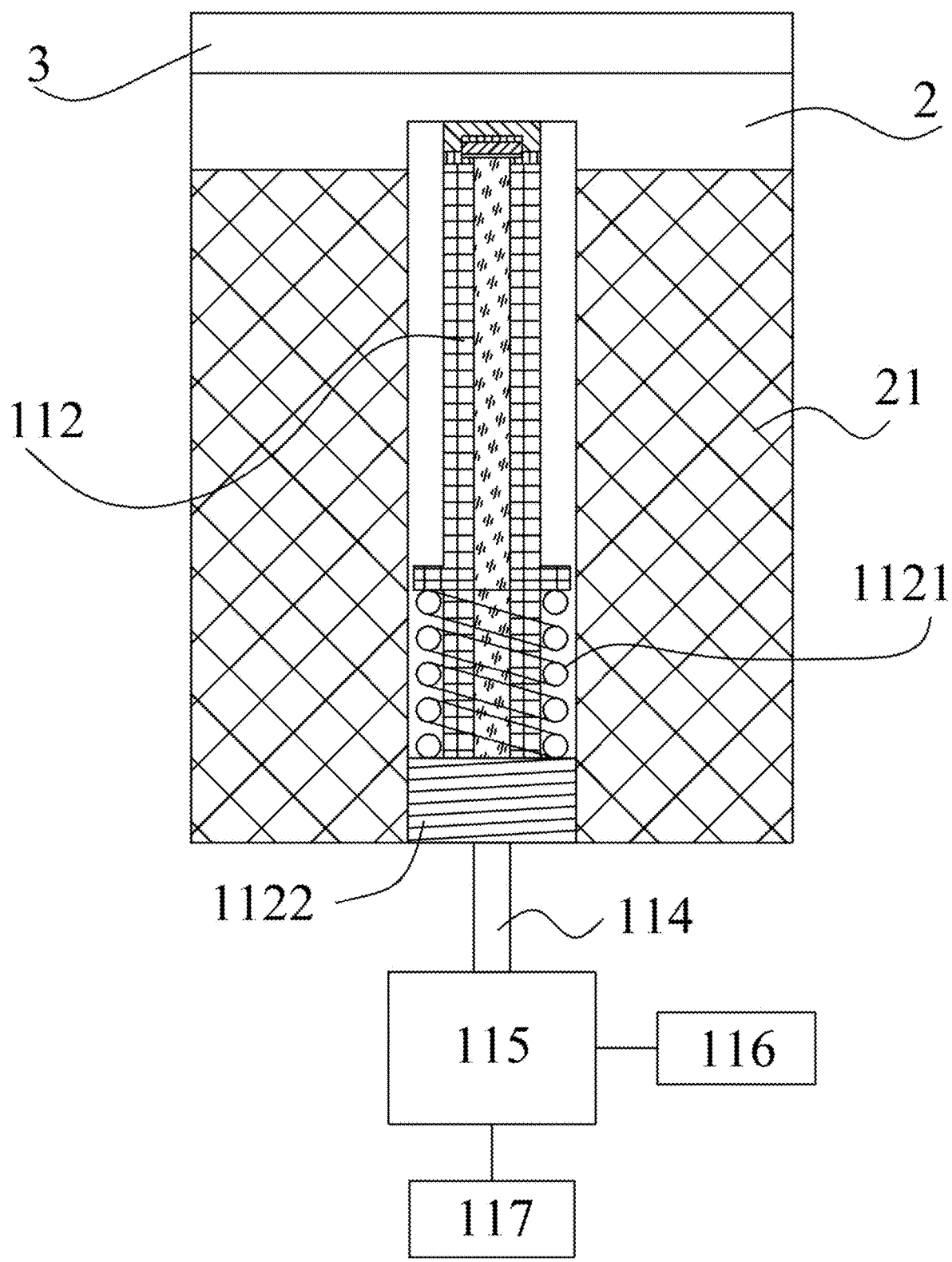
FIG. 7 is a structural diagram of a ceramic sleeve according to another embodiment.

In some embodiments, there is a gap (corresponding to a blank region below the fluorescent layer 1111 in FIG. 4) between the fluorescent layer 1111 and the transition optical fiber 113, and a gap value ranges from 0.2 mm to 0.4 mm, thus avoiding a heat bridge resulting from the direct contact between the fluorescent layer 1111 and the ceramic sleeve, and achieving thermal insulation. In addition, as shown in FIG. 7, in some embodiments of the present disclosure, one end, close to the transmission optical fiber 114, of the ceramic sleeve 112 is provided with a compression spring 1121 and a set screw 1122 capable of being fixedly connected to the electrostatic chuck 2, where the reference numeral 21 indicates a cooling layer of the electrostatic chuck. By such an arrangement, the temperature sensor 11 can be adjusted forward and backward by adjusting the set screw 1122, while the compression spring 1121 plays a fastening role, thus finally ensuring that the temperature sensor 11 is located at an appropriate position relative to a temperature measurement point on the semiconductor wafer 3.

In some embodiments, one end of the transmission optical fiber 114 is connected to the other end of the transition optical fiber 113, the other end of the transmission optical fiber 114 is connected to a first end of the optical coupling module 115, a second end of the optical coupling module 115 is connected to the photodetection module 116, and a third end of the optical coupling module 115 is connected to the operation light source module 117. During practical use, the operation light source modull 117 can output incident light capable of exciting the fluorescent layer 1111 to generate fluorescence, while the photodetection module 116 can detect lifetime of a fluorescent signal reflected by the fluorescent layer 1111 and rapidly determine a temperature of a fluorescent material corresponding to the lifetime of the fluorescence signal according to a mapping relationship between the lifetime of the fluorescence and the temperature of the fluorescent material, where for example, the mapping relationship can be described as, but not limited to, a function curve and a two-dimensional table, which can be obtained through experimental data.

As another aspect, an embodiment of the present disclosure further provides an etcher, in which temperature sensors 111 of the multichannel optical fiber fluorescence temperature measurement device 11 are arranged at different regions of the electrostatic chuck 2.

Figure 8:
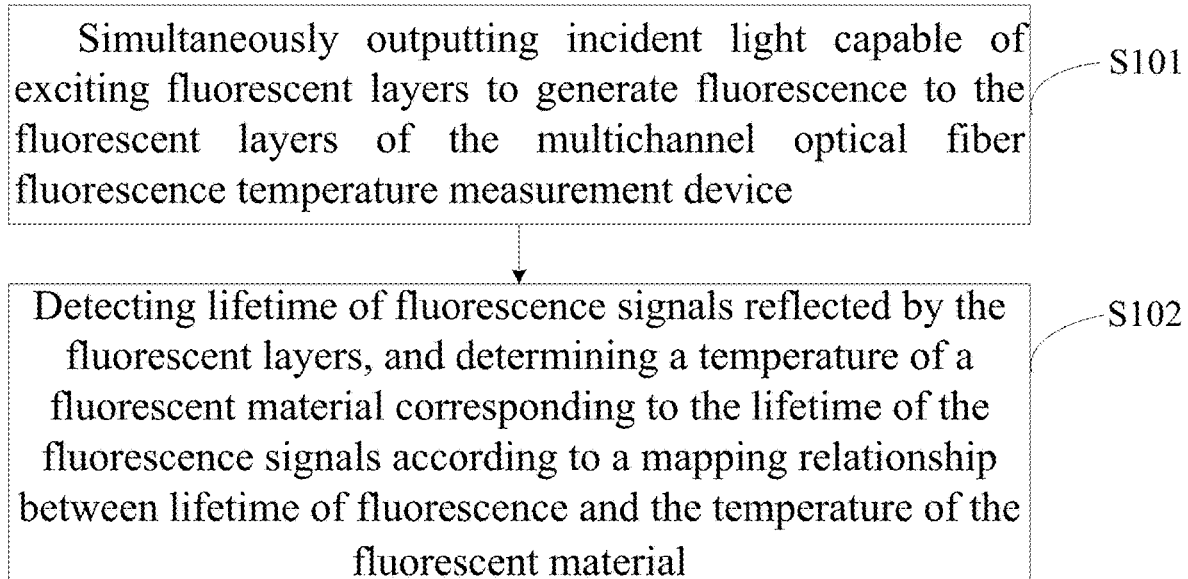
FIG. 8 is a flow chart of a multichannel optical fiber fluorescence temperature measurement method according to an embodiment.

Based on above embodiments, an embodiment of the present disclosure provides a multichannel optical fiber fluorescence temperature measurement method, which can be applied to the multichannel optical fiber fluorescence temperature measurement device in the embodiments corresponding to FIG. 1 to FIG. 7. FIG. 8 is a flow diagram of a multichannel optical fiber fluorescence temperature measurement method according to an embodiment of the present disclosure, and the method specifically includes steps S101 and S102.

S101: incident light capable of exciting fluorescent layers to generate fluorescence is simultaneously output to the fluorescent layers of the multichannel optical fiber fluorescence temperature measurement device.

In some embodiments, the incident light output by an operation light source module 117 in the multichannel optical fiber fluorescence temperature measurement device 1 is transmitted to a transmission optical fiber 114 via an optical coupling module 115, and then irradiates on the fluorescent layer 1111 at the head of the transition optical fiber 113 to excite the fluorescence, where the thermal conductive layer 1112 at a front end of the fluorescent layer 1111 is in contact with the electrostatic chuck 2 to rapidly and accurately conduct heat to the fluorescent layer 1111.

S102: lifetime of a fluorescence signal reflected by the fluorescent layer is detected, and a temperature of a fluorescent material corresponding to the lifetime of the fluorescence signal is determined according to a mapping relationship between the lifetime of the fluorescence and the temperature of the fluorescent material.

In some embodiments, the fluorescence signal excited from the fluorescent layer 1111 is returned to the optical coupling module 115 after passing through the transition optical fiber 113 and the transmission optical fiber 114, and the photodetection module 116 is configured to detect the lifetime of the fluorescence signal, and determine the temperature of the fluorescent material corresponding to the lifetime of the fluorescence signal.

It needs to be noted that the description of the same steps and contents in this embodiment as in other embodiments can refer to the description in other embodiments, and thus will not be repeated here.

According to a multichannel optical fiber fluorescence temperature measurement device for an electrostatic chuck in the etcher as well as a multichannel optical fiber fluorescence temperature measurement method provided by the present disclosure, the temperature distribution on the surface of the semiconductor wafer adsorbed by the electrostatic chuck can be accurately measured simultaneously by arranging the same temperature sensors at different regions of the electrostatic chuck, respectively, with high consistency and interchangeability. Moreover, the fluorescent layer in each temperature sensor is prepared by a hot-press sintering method, an end face of the fluorescent layer is gold-plated, and then is connected to a thermal conductive layer by a vacuum reflow void-free welding process. That is, the whole fluorescence temperature probe is glue-free, which can meet the temperature measurement requirements above 400° C., and avoid a temperature tolerance limit of only 200° C. caused by using epoxy resin glue, thereby effectively broadening the temperature measurement range. Moreover, the thermal conductive layer includes a copper-diamond composite material, which has a thermal conductivity is 1,000 W/m.° C., which means a faster thermal conduction speed, more accurate measured temperature information, and higher temperature measurement frequency, and can obtain the temperature measurement accuracy less than or equal to +0.1° C. A position opposite to the fluorescent layer is further provided with a transition optical fiber, and the transition optical fiber is connected to the transmission optical fiber to transmit the fluorescence signal, thereby achieving strong electromagnetic interference resistance. The outside of the transition optical fiber is coated with a ceramic sleeve, and an end face of the ceramic sleeve is gold-plated and connected to the fluorescence temperature probe by the vacuum reflow void-free welding process, thus being glue-free, and isolating the adverse effect of external heat on the transition optical fiber, such that the photodetection module can detect the lifetime of the fluorescence signal reflected by the fluorescent layer, and rapidly determine the temperature of the fluorescent material corresponding to the lifetime of the fluorescence signal according to the mapping relationship between the lifetime of the fluorescent and the temperature of the fluorescent material, thereby obtaining the temperature of the surface of the semiconductor wafer.

The technical features of the above embodiments can be combined at will. To make the description concise, not all possible combinations of various technical features in the above embodiments are described. However, these combinations of technical features should be considered to fall within the scope recorded in this specification provided as long as these combinations of technical features do not have any conflict.

Specific examples are used herein for illustration of the principles and embodiments of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A multichannel optical fiber fluorescence temperature measurement device for an electrostatic chuck in an etcher, wherein the multichannel optical fiber fluorescence temperature measurement device (1) comprises temperature sensors (11) arranged at different regions of the electrostatic chuck (2), wherein each temperature sensor (11) comprises a fluorescence temperature probe (111), a ceramic sleeve (112), a transition optical fiber (113), a transmission optical fiber (114), an optical coupling module (115), a photodetection module (116), and an operation light source module (117); wherein:
   the fluorescence temperature probe (111) comprises a fluorescent layer (1111) and a thermal conductive layer (1112) which are arranged in a stacked manner; the fluorescent layer (1111) is prepared by a hot-press sintering method, and an end face of the fluorescent layer (1111) is gold-plated; the thermal conductive layer (1112) comprises a copper-diamond composite material, and an end face of the thermal conductive layer (1112) is gold-plated and is connected to the end face of the fluorescent layer (1111) by a vacuum reflow void-free welding process; the ceramic sleeve (112) is configured to coat the transition optical fiber (113), and an end face of the ceramic sleeve (112) is gold-plated and is connected to the fluorescence temperature probe (111) by the vacuum reflow void-free welding process;
   one end of the transition optical fiber (113) is arranged opposite to the fluorescent layer (1111), an other end of the transition optical fiber (113) is connected to one end of the transmission optical fiber (114), an other end of the transmission optical fiber (114) is connected to a first end of the optical coupling module (115), a second end of the optical coupling module (115) is connected to the photodetection module (116), and a third end of the optical coupling module (115) is connected to the operation light source module (117); the operation light source module (117) is configured to output incident light capable of exciting the fluorescent layer (1111) to generate fluorescence, and the photodetection module (116) is configured to detect lifetime of a fluorescence signal reflected by the fluorescent layer (1111), and determine a temperature of a fluorescent material corresponding to the lifetime of the fluorescence signal according to a mapping relationship between lifetime of fluorescence and the temperature of the fluorescent material.

2. The multichannel optical fiber fluorescence temperature measurement device according to claim 1, wherein the fluorescent layer (1111) comprises rare earth tricolor fluorescent powder, gadolinium terbium oxysulfide, and magnesium fluoro-germanate.

3. The multichannel optical fiber fluorescence temperature measurement device according to claim 2, wherein a gold plating thickness on the end face of the fluorescent layer (1111) ranges from 1 μm to 3 μm.

4. The multichannel optical fiber fluorescence temperature measurement device according to claim 3, wherein the ceramic sleeve (112) comprises a zirconia material, or a silicon nitride material.

5. The multichannel optical fiber fluorescence temperature measurement device according to claim 2, wherein the ceramic sleeve (112) comprises a zirconia material, or a silicon nitride material.

6. The multichannel optical fiber fluorescence temperature measurement device according to claim 1, wherein there is a gap between the fluorescent layer (1111) and the transition optical fiber (113), and a gap value ranges from 0.2 mm to 0.4 mm.

7. The multichannel optical fiber fluorescence temperature measurement device according to claim 6, wherein the ceramic sleeve (112) comprises a zirconia material, or a silicon nitride material.

8. The multichannel optical fiber fluorescence temperature measurement device according to claim 1, wherein the thermal conductive layer (1112) is of an inverted concave structure, a first end surface, connected to the fluorescent layer (1111), in the inverted concave structure is gold-plated, and a second end surface, connected to the ceramic sleeve (112), in the inverted concave structure is gold-plated.

9. The multichannel optical fiber fluorescence temperature measurement device according to claim 8, wherein a gold plating thickness on each of the first end face and the second end face ranges from 1 μm to 3 μm.

10. The multichannel optical fiber fluorescence temperature measurement device according to claim 1, wherein the ceramic sleeve (112) comprises a zirconia material, or a silicon nitride material.

11. The multichannel optical fiber fluorescence temperature measurement device according to claim 10, wherein a solder between the fluorescent layer (1111) and the thermal conductive layer (1112) is gold-tin solder, and a solder between the fluorescence temperature probe (111) and the ceramic sleeve (112) is lead solder.

12. The multichannel optical fiber fluorescence temperature measurement device according to claim 10, wherein one end, close to the transmission optical fiber (114), of the ceramic sleeve (112) is provided with a compression spring (1121) and a set screw (1122) which are able to be fixedly connected to the electrostatic chuck (2).

13. A multichannel optical fiber fluorescence temperature measurement method, wherein the multichannel optical fiber fluorescence temperature measurement method is applied to the multichannel optical fiber fluorescence temperature measurement device according to claim 1, and comprises:
- simultaneously outputting incident light capable of exciting fluorescent layers to generate fluorescence to the fluorescent layers of the multichannel optical fiber fluorescence temperature measurement device; and
- detecting lifetime of fluorescence signals reflected by the fluorescent layers, and determining a temperature of a fluorescent material corresponding to the lifetime of the fluorescence signals according to a mapping relationship between lifetime of fluorescence and the temperature of the fluorescent material.

* * * * *